United States Patent
Hladik, Jr.

(10) Patent No.: US 10,097,665 B2
(45) Date of Patent: Oct. 9, 2018

(54) NUMERICAL COMPUTATION OF PROFILED DEGREES OF ALIGNMENT IN SOCIAL NETWORKING

(71) Applicant: International Business Machines Corporation, Armonk, NY (US)

(72) Inventor: William J. Hladik, Jr., Harrisburg, NC (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 14/593,004

(22) Filed: Jan. 9, 2015

(65) Prior Publication Data

US 2016/0203223 A1 Jul. 14, 2016

(51) Int. Cl.
G06F 17/30 (2006.01)
H04L 29/08 (2006.01)
G06Q 50/00 (2012.01)

(52) U.S. Cl.
CPC .......... H04L 67/306 (2013.01); G06Q 50/01 (2013.01)

(58) Field of Classification Search
CPC ..... H04L 51/32; H04L 67/306; H04L 63/102; G06Q 50/01; G06Q 30/0256; G06Q 30/0269; G06Q 30/0261; G06Q 30/0257; G06F 17/3053; G06F 17/30867; G06F 17/30554; G06F 17/30598; G06F 17/30702; G06F 17/30528; G06F 17/30029
USPC ........................................................ 709/203
See application file for complete search history.

(56) References Cited

U.S. PATENT DOCUMENTS

| | | | |
|---|---|---|---|
| 8,015,119 B2 * | 9/2011 | Buyukkokten | G06Q 30/02 705/319 |
| 8,135,800 B1 * | 3/2012 | Walsh | G06F 17/30702 707/723 |
| 8,666,990 B2 | 3/2014 | Wu | |
| 8,680,985 B2 | 3/2014 | Brady, Jr. et al. | |
| 2005/0076053 A1 * | 4/2005 | Katayama | G06F 17/30722 |
| 2005/0159970 A1 * | 7/2005 | Buyukkokten | G06Q 30/02 705/319 |
| 2006/0042483 A1 | 3/2006 | Work et al. | |
| 2007/0171716 A1 * | 7/2007 | Wright | G06T 11/206 365/185.12 |
| 2010/0036934 A1 * | 2/2010 | Bruster | G06F 17/30 709/219 |
| 2013/0030950 A1 * | 1/2013 | Leng | G06Q 50/01 705/26.7 |
| 2013/0031162 A1 * | 1/2013 | Willis | H04L 67/02 709/203 |
| 2013/0212173 A1 | 8/2013 | Carthcart et al. | |
| 2013/0212180 A1 | 8/2013 | Work et al. | |

(Continued)

OTHER PUBLICATIONS

Anonymous, "Attitudinal Filter for Social Media Posts", IP.com Prior Art Database Technical Disclosure, Jun. 12, 2012, 2 pages.

*Primary Examiner* — Tu Nguyen
(74) *Attorney, Agent, or Firm* — Maeve M. Carpenter; Maxine L. Barasch; Keohane & D'Alessandro PLLC

(57) ABSTRACT

Embodiments of the present invention provide an approach to processing and displaying a social media results list. Specifically, embodiments of the present invention focus on the content author and compute a score for each content author based on one or more conditions. The results list of the social media system is then processed based on the score, referred to as a Profiled Degree of Alignment (PDA) Value.

12 Claims, 4 Drawing Sheets

(56) References Cited

U.S. PATENT DOCUMENTS

| | | | |
|---|---|---|---|
| 2013/0297581 A1* | 11/2013 | Ghosh | G06F 17/30864 707/706 |
| 2014/0089306 A1* | 3/2014 | Rana | G06F 17/30554 707/731 |
| 2014/0122472 A1* | 5/2014 | Wells | G06F 17/30864 707/732 |
| 2014/0358942 A1* | 12/2014 | Ramesh | G06Q 30/02 707/748 |
| 2016/0034465 A1* | 2/2016 | Sinha | G06F 17/3053 707/732 |
| 2016/0092551 A1* | 3/2016 | Tang | H04L 51/32 707/740 |

* cited by examiner

NUMERICAL COMPUTATION OF PROFILED DEGREES OF ALIGNMENT IN SOCIAL NETWORKING

FIELD OF THE INVENTION

The present invention relates generally to the field of communications systems and, in particular, to a system and method for computing a numerical value associated with profile alignment within a social networking system.

BACKGROUND

Social media networks such as Facebook®, Twitter®, and LinkedIn® have experienced significant growth in recent years. Many people are using various forms of social media systems every day to communicate and stay in touch with each other. These people generate large amounts of social networking content. As the amount of social media content continues to grow, it is desirable to have improvements in the management of social media information.

SUMMARY

In a first aspect, embodiments of the present invention provide a computer-implemented method of processing a social media content stream comprising a plurality of content items, the method comprising: obtaining an author profile for an author associated with each content item in the social media content stream; computing a numerical score corresponding to a profiled degree of alignment (PDA) value for each author profile based on a scenario; and generating a new social media content stream based on the PDA value for each author.

In a second aspect, embodiments of the present invention provide a system for processing a social media content stream comprising a plurality of content items, comprising: a memory medium comprising program instructions; a bus coupled to the memory medium; and a processor, for executing the program instructions, coupled to the memory medium that when executing the program instructions causes the system to: obtain an author profile for an author associated with each content item in the social media content stream; compute a numerical score corresponding to a profiled degree of alignment (PDA) value for each author profile based on a scenario; and generate a new social media content stream based on the PDA value for each author.

In a third aspect, embodiments of the present invention provide a computer program product for processing a social media content stream comprising a plurality of content items, the computer program product comprising a computer readable storage device, and program instructions stored on the computer readable storage device, to: obtain an author profile for an author associated with each content item in the social media content stream; compute a numerical score corresponding to a profiled degree of alignment (PDA) value for each author profile based on a scenario; and generate a new social media content stream based on the PDA value for each author.

BRIEF DESCRIPTION OF THE DRAWINGS

Features of this invention will be more readily understood from the following detailed description of the various aspects of the invention taken in conjunction with the accompanying drawings.

DETAILED DESCRIPTION

Example embodiments will now be described more fully herein with reference to the accompanying drawings, in which example embodiments are shown. This disclosure may, however, be embodied in many different forms and should not be construed as limited to the example embodiments set forth herein. Rather, these example embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach to processing and displaying a social media results list. Specifically, embodiments of the present invention focus on the content author and compute a score for each content author based on one or more conditions. The results list of the social media system is then processed based on the score, referred to as a Profiled Degree of Alignment (PDA) Value.

Figure 1:
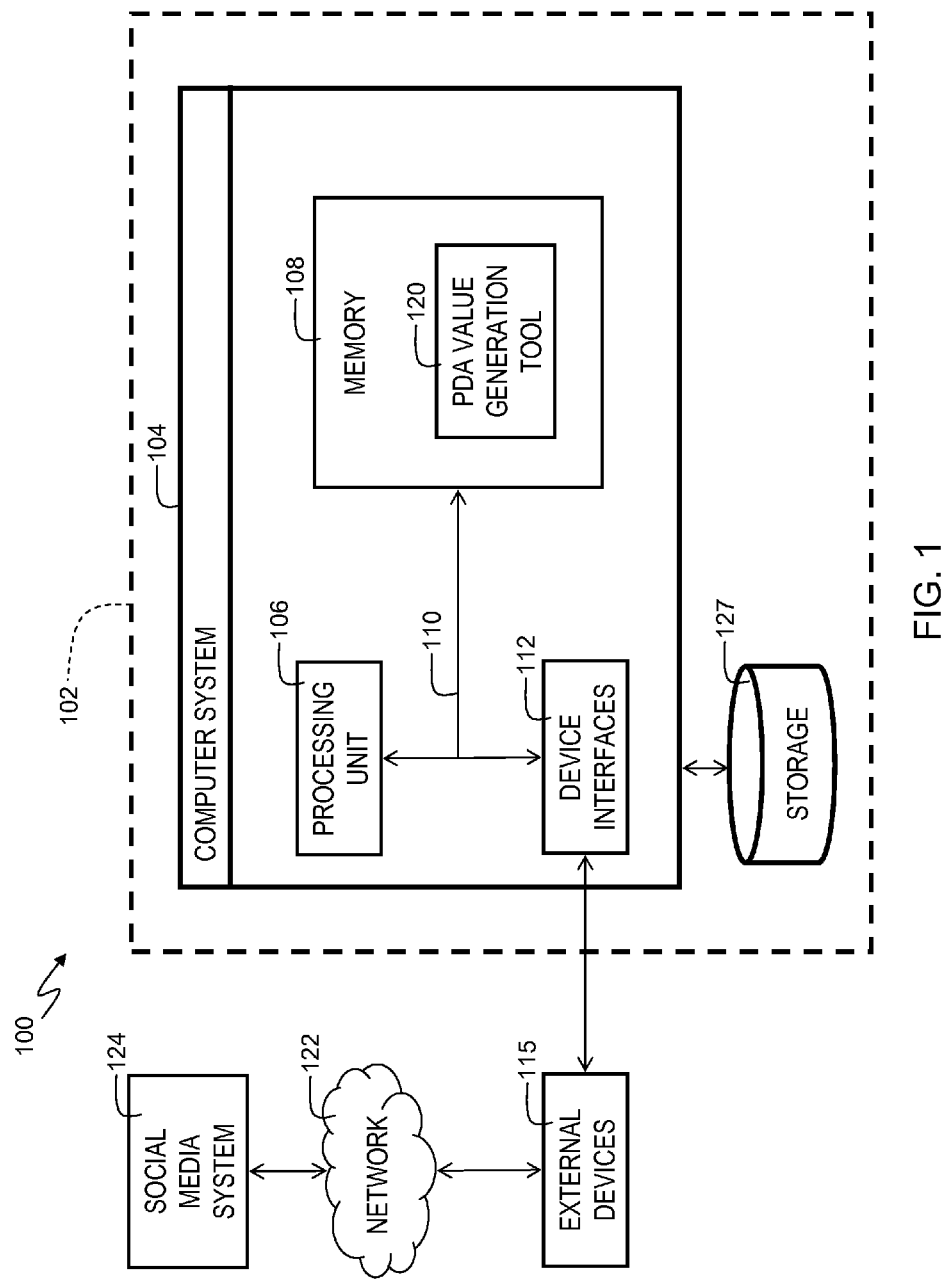
FIG. 1 depicts a computerized implementation according to an embodiment of the present invention.

FIG. 1 depicts a computerized implementation 100 according to an embodiment of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing a system and method for processing and displaying a social media results list in accordance with embodiments of the present invention. It should be understood that any other computers implemented under the present invention may have different components/software, but will perform similar functions. As shown, computer system 104 includes a processing unit 106, memory 108 for storing a PDA Value Generation tool 120, a bus 110, and device interfaces 112.

Processing unit 106 collects and routes signals representing outputs from external devices 115 (e.g., a keyboard, a pointing device, a display, a graphical user interface, a router, etc.) to PDA value generation tool 120. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating PDA value generation tool 120, which is stored in memory 108 and/or storage device 127. While executing computer program code, processing unit 106 can read and/or write data to/from memory 108. Additional data storage device 127 may include, but is not limited to, DVRs, RAID arrays, USB hard drives, SATA hard drives, optical disk recorders, flash storage devices, or any other similar storage device. Although not shown, computer system 104 could also include I/O interfaces that communicate with one or more external devices 115 that enable a user to interact with computer system 104. External devices may include routers or other network devices configured and disposed to communicate to social media system (SMS) 124 via network 122. In some embodiments, network 122 may include the Internet. In embodiments, SMS 124 provides a results list to computer system 104 via network 122. The computer system 104 processes the results list to generate a new social media content stream (results list), based on the PDA value associated with each content author that provided content to a social media stream. For each author, there is an author profile that contains information about that author. Author profile information may include, but is not limited to, age, gender, education level, hobbies, jurisdiction of residence, and work experience. The PDA value for each author is computed using information in the author profile for that author.

Figure 2:
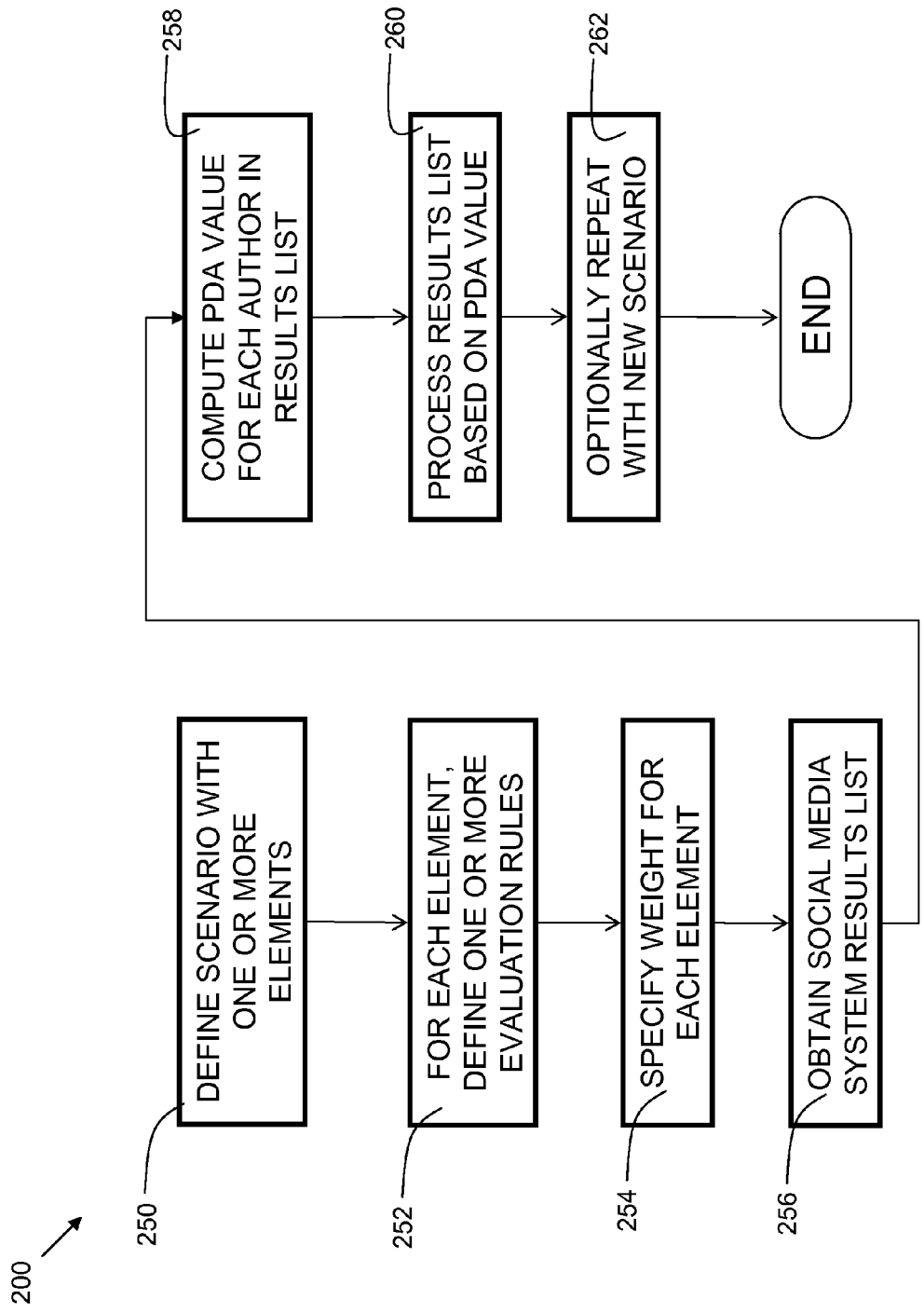
FIG. 2 is a flowchart indicating process steps for embodiments of the present invention.

FIG. 2 is a flowchart 200 showing process steps in accordance with embodiments of the present invention. In process step 250, a scenario is defined with one or more elements. A scenario is a collection of rules, formulas, and/or Boolean expressions that describe how close a given person (author) is to a desired set of attributes. In some embodiments, the desired set of attributes is based on a user. Thus, in some embodiments, the scenario may look for people "like me." In some embodiments, the scenario may be designed to look for people that are not like the user (e.g. men seeking women, etc.). The scenarios may be built-in scenarios provided by the social media system. In other embodiments, users of the social media system may create their own scenarios. Multiple elements can be combined in a scenario. For example, a user may seek to read social media posts from people of the same gender, age, and education level as they are, and thus can create a scenario that incorporates elements that include age, gender, and education level.

In process step 252, one or more evaluation rules are defined for each element in the scenario. Table 1 below shows an exemplary element evaluation table.

TABLE 1

| Element Name | Attribute Evaluation | Score | Comment |
| --- | --- | --- | --- |
| Sex | {SEX} = "M" | 25 | Author is male |
| Sex | {SEX} = "F" | 35 | Author is female |
| Foreign | {GEO} < > [GEO] | 50 | Author is from a different geographic region than the user |
| Level | {POSITION} >= [POSITION] | 90 | Author position is greater or equal to the user |
| Level | {POSITION} < [POSITION] | 90 | Author position is lower than the user |
| Service | {YEARS} * 5 | X | Variable, 5 points per year of service |
| Age | {AGE} < [AGE] | 10 | Author is younger than the user |
| Age | {AGE} > [AGE] | 90 | Author is the same age or older than the user |

The element names in table 1 include sex (gender), foreign (if the author is in a different jurisdiction than the user), level (such as a managerial rank or administrative level within an organization), service (how long the author has been with the organization), and age of the author. Note that this list of elements is not exhaustive, and other embodiments may have more or fewer elements. For example, "friend status" or other measure of social network connectivity may also be included amongst the elements. Furthermore, some elements do not apply in certain settings. The nomenclature of Table 1 uses curly braces "{ }" to define a value pertaining to the user (the user is the person desiring to process the SMS results list). The square braces "[ ]" define a value pertaining to the author (the author is anyone who generates content within a social media system, such as a social media post in the results list, photo, illustration, video, audio clip, or any other content type supported by the social media system). Multiple rules may be applied for a given element. Thus, referring to the "age" element at the bottom of Table 1, there are two rules given. The first age rule states that if the author is younger than the user, then a score of 10 is given. The second age rule states that if the author is of the same age or older than the user, then a score of 90 is given. Similarly, there are two rules for the first element of sex (gender). The first sex rule states that if the sex is male, then a score of 25 is given. The second sex rule states that if the sex is female, then a score of 35 is given. Hence, in this example, female authors are given preference over male authors. Rules may also be dynamic. In any case, a numerical score, whether the rule is static (fixed as referenced above) or dynamic, is associated with each rule. A dynamic rule results in a score that is proportional to its input variables. For example, the service rule awards a score of 5 points for every year of service. For example, if an author has been with his company/organization for 10 years, then a score of 5×10=50 is given. Many other rules are possible and within the scope of embodiments of the present invention. For example, a distance element may be defined with a graduated distance rule. As an example, suppose a user living in Greensboro, N.C. wants to find social media content from people living within 50 miles of him. The user, an agent of the user, and/or some other entity might define a graduated distance rule as follows:

A) If (dist<X) then score=100(X−dist)/X
B) If (score<0) then score=0

Part A of the rule creates a scoring behavior where the closer an author lives to Greensboro, N.C., the higher the distance score. Part B of the rule infers that no score is given if the user is outside the predetermined radius (e.g., 50 miles) from Greensboro, N.C.

Optionally, a compound distance jurisdictional rule may be used. In such a rule, a distance is paired with a jurisdiction using a Boolean operator. For example, suppose the user wants to find social media content from authors that are within 50 miles from Greensboro, N.C., but only wants to consider authors from North Carolina. Since a 50 mile radius from Greensboro, N.C. extends into Virginia, using a radius alone does not achieve this result. In such a case, a rule may have the form of:

If (dist<$X$) AND {GEO}="North Carolina" then score=100($X$−dist)/$X$.

This rule may be used to eliminate any results from Virginia, even if they are within 50 miles of Greensboro, N.C.

Note other graduated rules are possible. Examples include, but are not limited to, a graduated weight rule (example: 5 points for every 10 pounds lighter than the user), or a graduated temporal rule (example: 5 points for every year younger than the user, or 5 points for every year that the author graduated college before the user did).

In process step 254, a weight is specified for each element. For each element, a user can determine how much weight it is given in computing the PDA value. To this extent, the weight can include a numerical value that designates an importance of one PDA value with respect to other PDA values. An example weight table is shown in Table 2.

TABLE 2

| Element Name | Weight | Joanna | Laura | Tim | Ken | Ralph |
|---|---|---|---|---|---|---|
| Sex | 10 | 35 | 35 | 25 | 25 | 25 |
| Foreign | 20 | 50 | 0 | 0 | 90 | 50 |
| Level | 50 | 90 | 90 | 90 | 10 | 25 |
| Service | 80 | 75 | 10 | 10 | 60 | 10 |
| Age | 30 | 10 | 10 | 60 | 90 | 10 |
| ReportTo | 100 | 80 | 90 | 90 | 30 | 25 |
| Peer | 80 | 50 | 30 | 30 | 75 | 0 |
| Total | 370 | | | | | |

This table shows an exemplary weight for each element. Thus, the element of sex is weighted at 10, whereas the ReportTo element, which pertains to the reporting structure (e.g., superior/subordinate) relationship, is weighted at 100. In embodiments, multiple ReportTo rules may be defined as shown in Table 3.

TABLE 3

| ReportTo | { ReportTo } < [ ReportTo ] | 10 Author reports to the user |
|---|---|---|
| ReportTo | { ReportTo } > [ ReportTo ] | 80 User reports to the author |

Additional ReportTo rules are possible to reflect how many levels above/below the user that the author is. Referring again to Table 2, there are five authors (Joanna, Laura, Tim, Ken, and Ralph) and corresponding scores for each element. The total value of the weights is shown at the bottom of table 2. This value (in this example, 370) is used in computing the PDA value.

In process step 256, a social media results list is obtained. For example, referring again to FIG. 1, a social media system results list ("feed") is retrieved from SMS 124. In process step 258, a PDA value is defined for each content author in the results list. In embodiments, the PDA value is computed as follows:

The PDA value calculation is: sum(score*(weight/sum_of_weights))

Hence, the PDA value computation may include specifying a score for each element of the criteria, specifying a weight for each element of the criteria, multiplying each element score by its weight divided by a sum of all weights to derive a weighted element score, and summing each weighted element score.

This results in PDA values as follows in Table 4:

TABLE 4

| Element Name | Joanna | Laura | Tim | Ken | Ralph |
|---|---|---|---|---|---|
| Sex | 0.95 | 0.95 | 0.68 | 0.68 | 0.68 |
| Foreign | 2.7 | 0 | 0 | 0 | 2.7 |
| Level | 12.16 | 12.16 | 12.16 | 12.16 | 3.38 |
| Service | 16.22 | 2.16 | 2.16 | 16.22 | 2.16 |
| Age | 0.81 | 0.81 | 4.86 | 0.81 | 0.81 |
| ReportTo | 21.62 | 24.32 | 24.32 | 0 | 6.76 |
| Peer | 10.81 | 6.49 | 6.49 | 16.22 | 0 |
| PDA VALUE | 65.27 | 46.89 | 50.68 | 46.08 | 16.49 |

Thus, for example, Joanna's PDA value is 65.27, Laura's PDA value is 46.89, etc.

In process step 260, the social media system result list is processed based on the PDA value. In embodiments, the SMS result list is sorted from highest PDA value to lowest. In other embodiments, filtering is applied, so that only results with a PDA value higher than a predetermined value are shown (e.g., a PDA value of 50 or higher). Social media content from authors with a PDA value less than 50 may be omitted from the processed results list. In process step 262, optionally, the process is repeated with a different scenario. In embodiments, there may be multiple predefined scenarios. There may be one or more "like me" scenarios that attempt to find content from authors that are similar to the user. In embodiments, there is a "Like Me in Every Way" (LMEW) filter that uses both personal criteria (e.g., hobbies) and professional criteria (education, work experience, etc.) in a single scenario. Similarly, there may be a "Like Me Personally" (LMPER) scenario that only looks at personal elements (hobbies, interests, etc.). Similarly, there may be a "Like Me Professionally" (LMPRO) scenario that only looks at professional elements (education, job skills, etc.).

There may be an "Above Me Professionally" (AMP) scenario that looks for social media content from authors that are at a higher professional level within an organization. Similarly, there may be a "Below Me Professionally" (BMP) scenario that looks for social media content from authors that are at a lower professional level within an organization. Additionally, users may create user-defined (custom) scenarios to include any combination of personal and professional criteria that is available within the social media system, and use them to process a social media stream (results list). In some embodiments, the processed results may include social media content from people who are not connected to the user on the social media system. In embodiments, a user may be given an option to initiate a connection to the unconnected authors. In yet other embodiments, content metadata may also be included amongst the rules of a scenario. In such embodiments, in addition to evaluating the elements of the author of the content, attributes of the content itself may also be evaluated. As an example, a scenario may filter on a particular set of author attributes where the author-supplied content includes photos that exceed 3 megapixels. The use of content metadata within a scenario provides a mechanism to handle multiple content items from the same author within a social media system.

Figure 3:
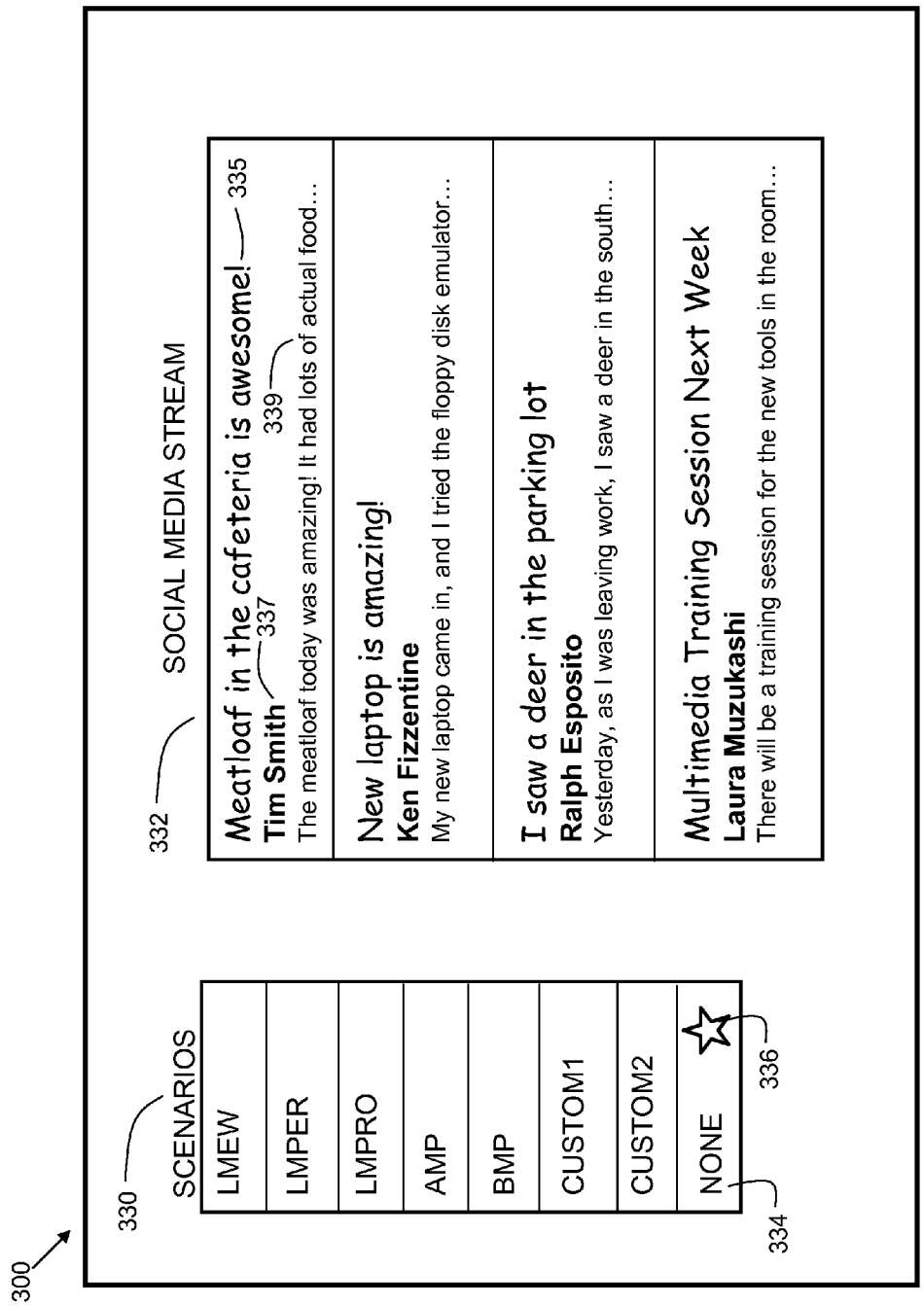
FIG. 3 is an exemplary user interface showing scenarios and an unprocessed social media system stream.

FIG. 3 shows an exemplary user interface 300 in accordance with embodiments of the present invention. A scenarios list 330 includes multiple scenarios. A social media stream (results list) 332 displays multiple content items (posts) from members of the social media system. Each post may include a title 335, an author name 337, and an introductory phrase 339 that shows the first few words of the post. Also, as shown in FIG. 3, the scenario NONE 334 is selected, as indicated by the selection icon 336. Since no scenario is selected, the content shown in social media stream 332 may be sorted by date of post.

Figure 4:
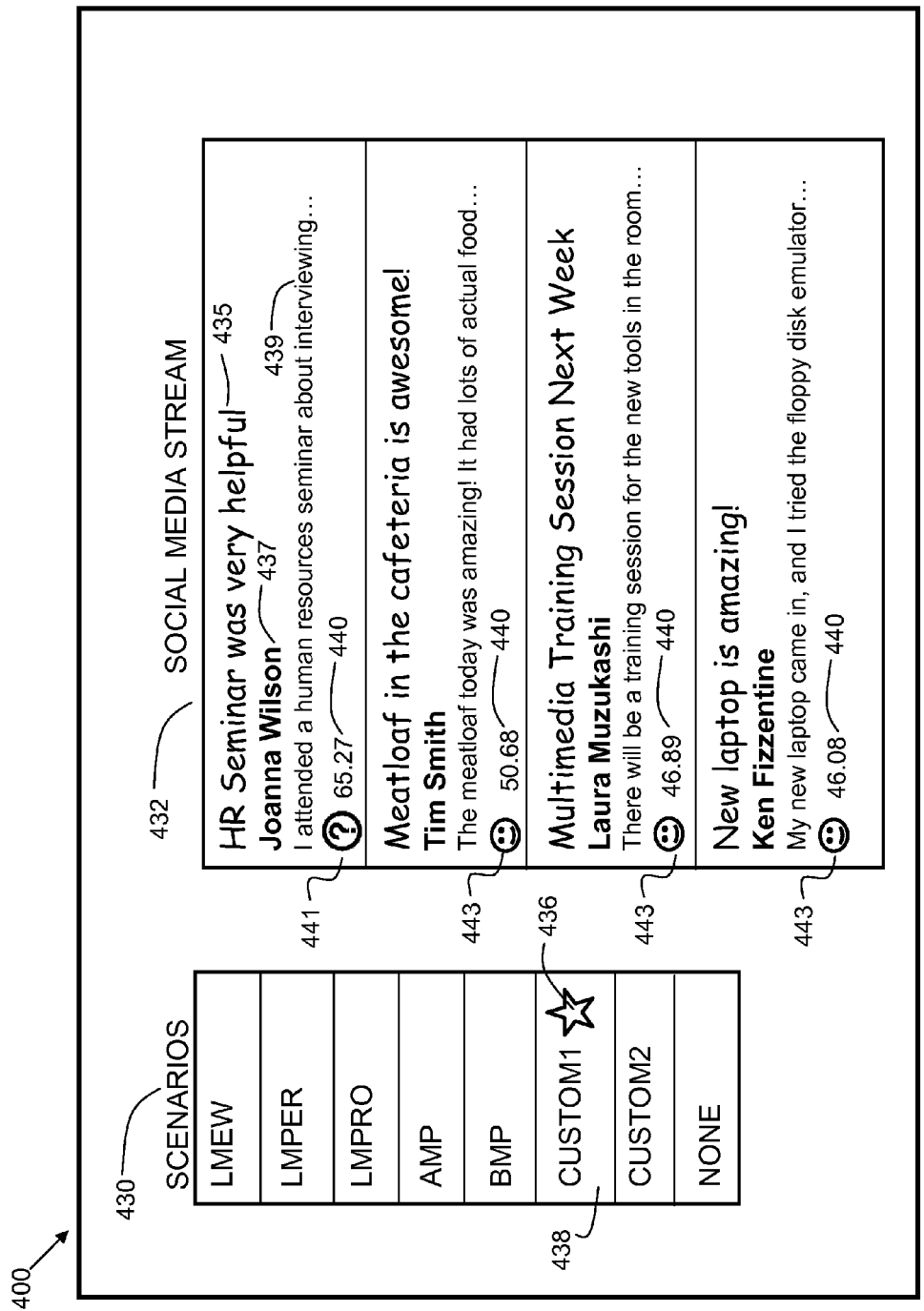
FIG. 4 is an exemplary user interface showing scenarios and a processed social media system stream.

FIG. 4 shows an exemplary user interface 400 in accordance with embodiments of the present invention. A scenarios list 430 includes multiple scenarios. A user can select one or more scenarios from scenarios list 430. A social media stream 432 displays multiple posts from members of the social media system based on the selected scenario or scenarios, if any. Each post may include a title 435, an author name 437, and an introductory phrase 439 that shows the first few words of the post. Also, as shown in FIG. 4, the scenario CUSTOM1 438 is selected, as indicated by the selection icon 436. The social media posts within social media stream 432 are now processed according to PDA value. Referring again to table 2 and table 4, since Joanna has the highest PDA value, her entry is shown first, followed by Tim, Laura, and Ken. Note that, compared with the unprocessed social media stream 332 of FIG. 3, Ralph is no longer shown, as his PDA value (16.49, see Table 4) is lower than the four posts shown in processed social media stream 432. For each entry, the PDA value 440 may be displayed. Additionally, a friend icon 443 may be displayed if the post came from an author who is connected to the user via the social media system. In some embodiments, the scenarios may result in display of posts from authors that are not connected to the user via the social media system. In such a case, an unconnected icon 441 may be shown. The unconnected icon 441 is associated with an unconnected participant (Joanna). In embodiments, a user may click on (select) the unconnected icon 441 to invoke an invitation to connect to that author. Hence, in this example, even though Joanna is an unconnected participant (a participant that is not connected to the user, e.g. as a friend), she has scored a high PDA value, based on the CUSTOM1 scenario (shown in Table 2 and Table 4). Therefore, Joanna's post is displayed. Thus, embodiments of the present invention allow a user to see potentially relevant posts that they otherwise may not be able to see. Further, in the event that multiple scenarios are selected, user interface 400 can simultaneously display a different scenarios list 430 for each selected scenario, allowing the user to compare the results arising from different scenarios.

Further, it can now be appreciated that embodiments of the present invention provide improved methods and systems for processing social media system streams. Streams may be sorted, filtered, and/or ranked based on a computed PDA value. The PDA value allows processing of a social media stream based on attributes of the content authors. Embodiments may be integrated into an existing social media system that exposes various user profile information (e.g. through application programming interface (API) calls). Additionally, embodiments, may be directly built in to a social media system, such as an internal company social media system.

It will be appreciated that the method process flowchart 200 of FIG. 2 represents one possible implementation of a process flow for social media stream processing, and that other process flows are possible within the scope of embodiments of the invention. The method process diagram discussed herein illustrates the architecture, functionality, and operation of possible implementations of systems, methods, and computer program products according to various embodiments of the present invention. In this regard, each portion of each flowchart may represent a module, segment, or portion of code, which comprises one or more executable instructions for implementing the specified logical function(s). It will also be noted that each block of each flowchart illustration can be implemented by special purpose hardware-based systems that perform the specified functions or acts.

Further, it can be appreciated that the approaches disclosed herein can be used within a computer system for processing and displaying a social media results list. In this case, as shown in FIG. 1, PDA value generation tool 120 can be provided, and one or more systems for performing the processes described in the invention can be obtained and deployed to computer infrastructure 102 (FIG. 1). To this extent, the deployment can comprise one or more of: (1) installing program code on a computing device, such as a computer system, from a computer-readable storage medium and/or computer readable storage device; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, PDA value generation tool may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided an approach for processing and displaying a social media results list. While embodiments of the invention have been particularly shown and described in conjunction with a preferred embodiment thereof, it will be appreciated that variations and modifications will occur to those skilled in the art. Therefore, it is to be understood that the appended claims are intended to cover all such modifications and changes that fall within the scope of embodiments of the present invention.

What is claimed is:

1. A computer-implemented method of processing a social media content stream comprising a plurality of content items, the method comprising:
   obtaining an author profile for an author associated with each content item in the social media content stream;
   receiving a plurality of elements from a user;
   receiving a weight for each element of the plurality of elements;
   computing a numerical score corresponding to a profiled degree of alignment (PDA) value for each author profile based on a scenario comprising the plurality of elements and the weight, the computing comprising:
      specifying a score for each element of the plurality of elements,
      multiplying each element score by its weight divided by a sum of all weights to derive a weighted element score, and
      summing each weighted element score;
   generating a new social media content stream based on the PDA value for each author;
   displaying the new social media content stream; wherein the new social media content stream comprises at least one post from a participant not connected to a profile of the user;
   displaying an icon in association with the at least one post in the social media content stream, the icon being an indicator that an author profile of the participant is not connected to the profile of the user;
   receiving a selection of the icon from the user; and
   invoking an invitation to the author profile of the participant to connect with the profile of the user.

2. The method of claim 1, wherein generating a new social media content stream comprises at least one of:
   sorting each content item based on PDA value; and
   filtering each content item based on PDA value.

3. The method of claim 1, wherein computing a profiled degree of alignment (PDA) value for each author based on a scenario comprises using a predefined scenario.

4. The method of claim 1, wherein computing a profiled degree of alignment (PDA) value for each author based on a scenario comprises using a user-defined scenario.

5. The method of claim 4, wherein using a user-defined scenario comprises using a dynamic rule.

6. The method of claim 5, wherein using a dynamic rule comprises using a graduated distance rule.

7. The method of claim 5, wherein using a dynamic rule comprises using a compound distance jurisdictional rule.

8. A system for processing a social media content stream comprising a plurality of content items, comprising:
   a memory medium comprising program instructions;
   a bus coupled to the memory medium; and
   a processor, for executing the program instructions, coupled to the memory medium that when executing the program instructions causes the system to:
      obtain an author profile for an author associated with each content item in the social media content stream;
      receive a plurality of elements from a user;
      receive a weight for each element of the plurality of elements;
      compute a numerical score corresponding to a profiled degree of alignment (PDA) value for each author profile based on a scenario comprising the plurality of elements and the weight, the computing comprising:
         specifying a score for each element of the plurality of elements,
         multiplying each element score by its weight divided by a sum of all weights to derive a weighted element score, and
         summing each weighted element score;
      generate a new social media content stream based on the PDA value for each author;
      display the new social media content stream; wherein the new social media content stream comprises at least one post from a participant not connected to a profile of the user;
      display an icon in association with the at least one post in the social media content stream, the icon being an indicator that an author profile of the participant is not connected to the profile of the user;
      receive a selection of the icon from the user; and
      invoke an invitation to the author profile of the participant to connect with the profile of the user.

9. The system of claim 8, wherein the memory medium further comprises instructions for using a dynamic rule.

10. The system of claim 8, wherein the memory medium further comprises instructions for:
    sort each content item based on PDA value; and
    filter each content item based on PDA value.

11. A computer program product for processing a social media content stream comprising a plurality of content items, the computer program product comprising a computer readable storage device, and program instructions stored on the computer readable storage device, to:

obtain an author profile for an author associated with each content item in the social media content stream;
receive a plurality of elements from a user;
receive a weight for at least one element of the plurality of elements;
compute a numerical score corresponding to a profiled degree of alignment (PDA) value for each author profile based on a scenario comprising the plurality of elements and the weight, the computing comprising:
  specifying a score for each element of the plurality of elements,
  multiplying each element score by its weight divided by a sum of all weights to derive a weighted element score, and
  summing each weighted element score;
generate a new social media content stream based on the PDA value for each content author;
display the new social media content stream; wherein the new social media stream comprises at least one post from a participant not connected to a profile of the user;
display an icon in association with the at least one post in the social media content stream, the icon being an indicator that an author profile of the participant is not connected to the profile of the user;
receive a selection of the icon from the user; and
invoke an invitation to the author profile of the participant to connect with the profile of the user.

12. The computer program product of claim 11, further comprising program instructions stored on the computer readable storage device, to
  sort each content item based on PDA value; and
  filter each content item based on PDA value.

* * * * *